Patented June 16, 1931

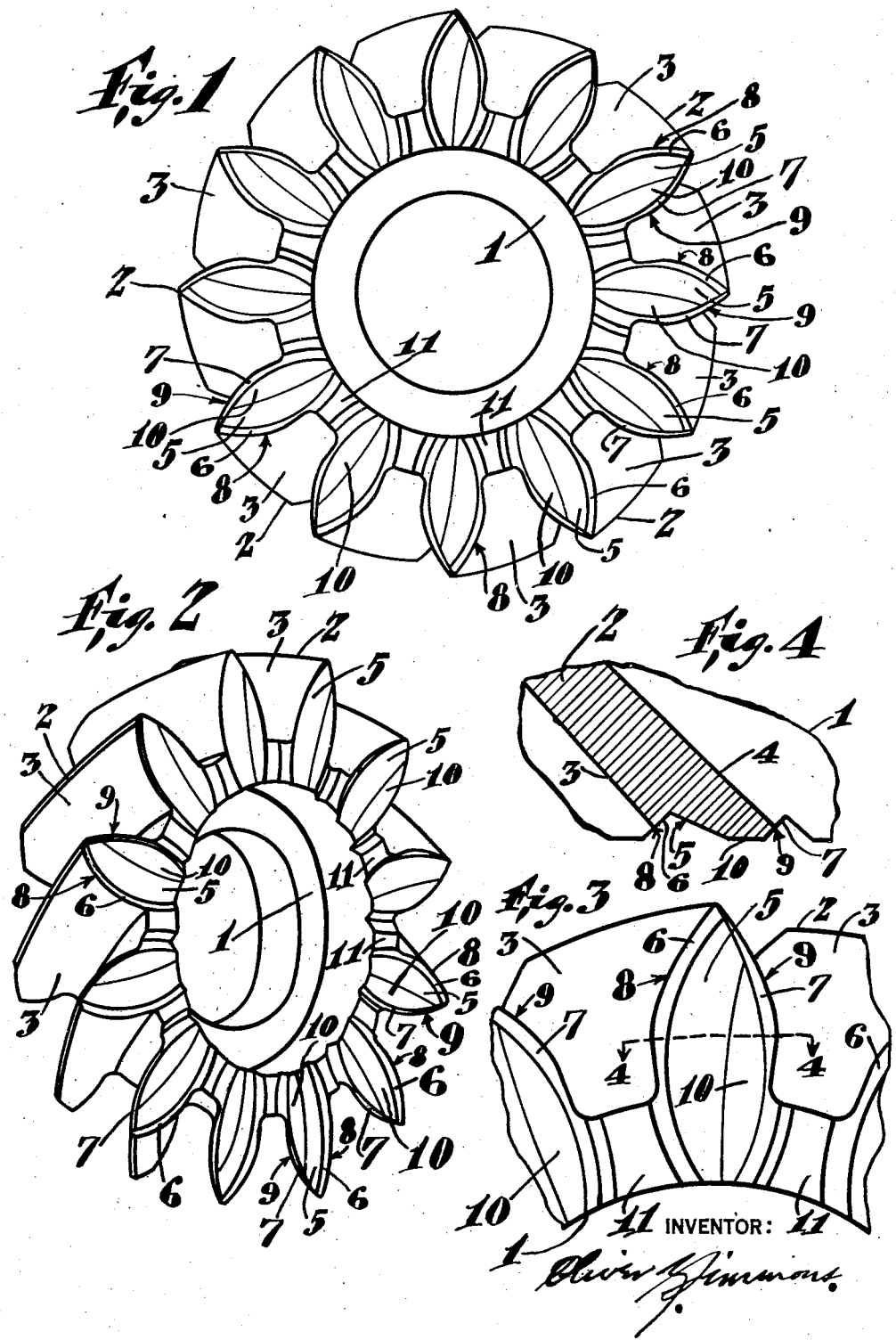

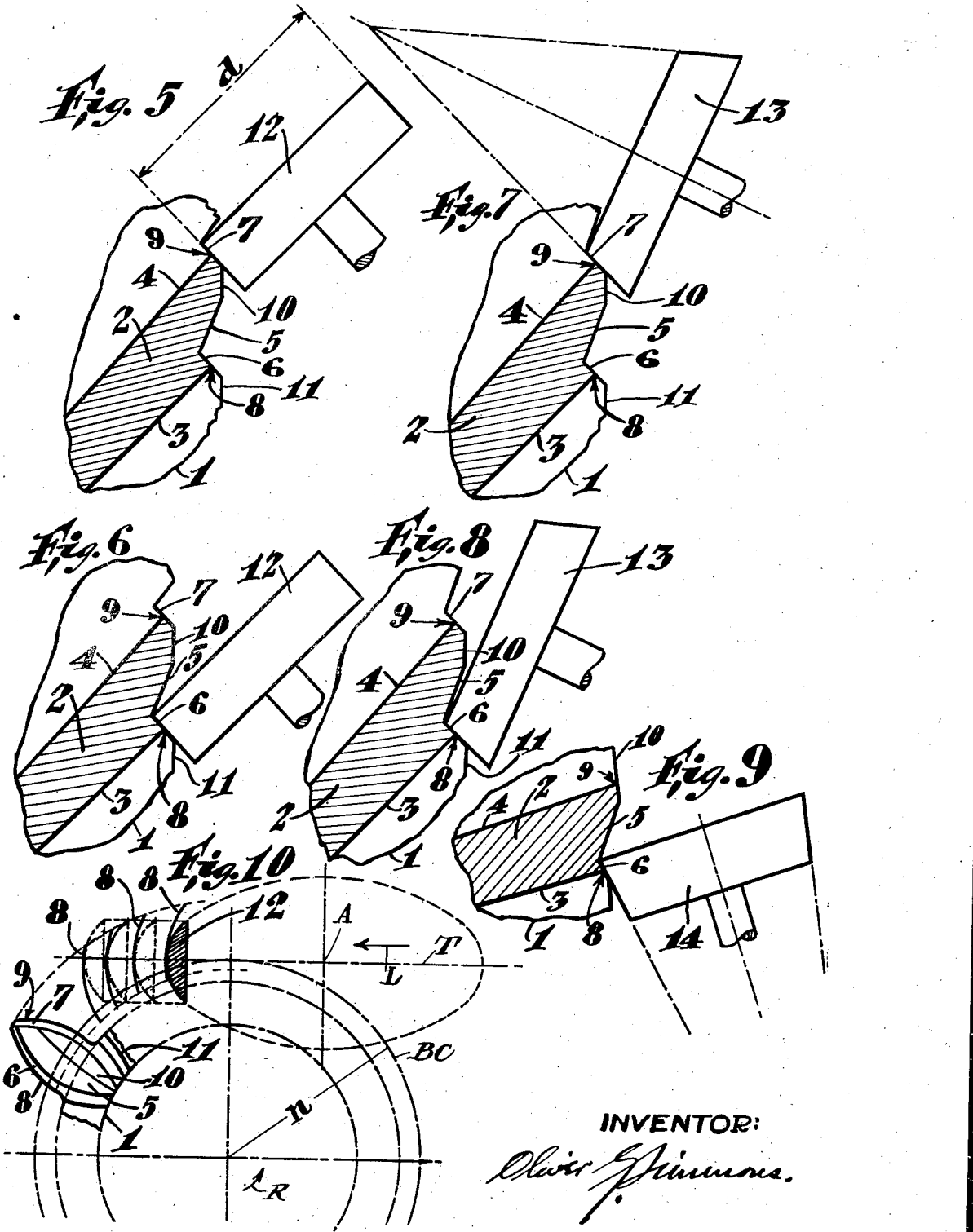

1,809,869

UNITED STATES PATENT OFFICE

OLIVER G. SIMMONS, OF LAKEWOOD, OHIO

GEAR SHAPER CUTTER AND METHOD OF MAKING SAME

Application filed February 15, 1930. Serial No. 428,846.

This invention relates to gear shaped cutters of the type used in gear shapers and also worm shaped cutters of the type referred to in my application for method of cutting worm wheels and the like, Serial No. 295,215, filed July 25, 1928, and also for use in thread generating machines and the like for cutting the involute helicoid teeth of helical gears, teeth of worm wheels, threads of worms, etc., the present invention relating particularly to the helical type of gear or worm shaped cutter specifically referred to herein and the method of forming the cutting edges of involute helicoid surface at the forward ends and intersecting the involute helicoid side surfaces of the cutter teeth.

In order to provide the necessary clearance for the side faces of the teeth of gear shaped cutters, the cutters are made to taper away from their cutting ends. This taper is produced by generating the involute side faces of the teeth to helices on the base cylinder which converge at a small angle. The rack of the cutter by reason of the convergence of the involute faces is inclined with respect to the axis of the cutter. The cutter in generating a gear or a worm is positioned with its axis in a plane parallel with the axis of the gear or worm and is reciprocated in said plane. In such position, the imaginary rack of the cutter is inclined at a small angle to the imaginary rack of the gear being generated and the cutter is reciprocated in a direction at an angle to its own rack.
If the rack of the cutter coincided with the rack of the gear or worm being generated, the form of the cutting edge would be unimportant since any line across the involute face of a cutter tooth would generate true involute tooth faces on the gear or worm work blank. However, with the cutter reciprocating in a direction at an angle to its own rack, true involute surfaces will not be generated in the work unless the cutting edge be of such form that the surface which it describes during its cutting stroke is an involute surface.

The intersection of the helicoid side faces of the cutter teeth with a plane perpendicular to the axis of the cutter is a true involute and fulfills this requirement, but on one or both sides of the teeth, the cutting edges formed by the intersection of side faces of the teeth with a flat end face perpendicular to the axis are too blunt for the most effective cutting action. In order to obtain sharper cutting edges for more effective cutting action, it has heretofore been common practice to grind back the end faces of the cutter with the result that the cutting edge does not conform exactly to the involute curve. In other words, efficiency of cutting action has been obtained at the expense of accuracy of contour of the surfaces generated by the cutter. While the resulting inaccuracy is generally quite minute, it is, nevertheless, undesirable.

An important object of the present invention is to provide a cutter having involute helicoid teeth with cutting edges, each cutting edge being the locus of the points of intersection of an involute helicoid surface normal to the involute helicoid side faces of the teeth of the cutter.

It is also an important object of the present invention to provide a cutter with cutting teeth which will generate involute curves, in planes of revolution, in helical gears, worms and the like, to a given pressure angle on each side of the teeth, when measured in a plane of revolution.

It is a further important object of this invention to provide a cutter with teeth of a predetermined form, adapting said cutter to generate involute curves to a given evolute on each side of the teeth of helical gears, worms and other analogous articles of manufacture which are to be provided with teeth having helicoidal involute side surfaces.

The present invention has for an important object to provide a gear shaped cutter with generated cutting edges of true involute form.

The present invention has for another important object to provide a gear shaped cutter with generated cutting edges of true helicoidal involute form.

The present invention has for a further important object to provide a helical gear shaped cutter with cutting edges of true involute helicoid form.

The present invention has for a further object to provide a cutter which has superior cutting action and which may be used for relatively long periods without re-sharpening.

A further object is to provide a cutter having teeth of helical form in which cutting edges of identical form are provided on opposite edges of each tooth and in which both cutting edges of each tooth are formed by the intersection of surfaces disposed at substantially the same angles to each other so that when the cutter is in use, both edges will have the same cutting action.

In my copending application Serial No. 261,813, filed March 15, 1928, I have disclosed a method of forming an acute angled cutting edge along the normally obtuse edge of a helical shaped tooth by which an exceedingly close approximation to an involute cutting edge may be formed. However, with cutters provided with teeth disposed at relatively large helix angles, it is difficult to obtain a cutting edge along the normally obtuse edge of the tooth which is of involute form and which has its faces disposed at an angle to each other corresponding to the angle between the surfaces forming the cutting edge at the opposite side of the tooth.

Furthermore, in cutters having a high helix angle, one side face of the tooth intersects the end face of the cutter at an angle which is sharper than it should be for the most effective generating action.

The present invention has for an object to obtain more accurate generating cutting action in gear shapers, thread generating machines and the like by providing a gear shaped cutter in which the cutting edges are true involutes formed by intersecting generated surfaces of involute form.

A further object of the present invention is to provide a helical cutter in which both cutting edges of each helical tooth are formed by involute helicoid surfaces intersecting at angles of 90° or slightly less, measured in tangent planes.

A further object is to provide a method of generating true involute cutting edges on the teeth of gear shaped cutters by generating helicoid surfaces on the end faces of the teeth along the cutting edges thereof which are involute to the same base cylinder as the side faces of the cutter teeth and which intersect said side faces to form involute cutting edges.

Within the scope of the term analogous articles of manufacture it is understood that there is included such articles as have teeth with side surfaces of involute helicoidal form capable of being generated on lines of convolution on a cylindrical or conical surface, to reproduce in an article of manufacture, symmetrical involute teeth, in a plane of revolution, and also symmetrical helicoidal involute teeth in substantially the surface of revolution in the general direction substantially longitudinally of the axis of the article of manufacture.

The invention further consists in the means for accomplishing the foregoing objects and other objects of the invention, which will later appear, not only in the particular form herein illustrated, but in all equivalent constructions and arrangements.

With the above and other objects in view, the invention may be said to comprise the cutter and method of making the same, as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification, in which:

Fig. 1 is an end elevation of a cutter involving the invention,

Fig. 2 is a perspective view of the cutter.

Fig. 3 is a fragmentary end elevation on an enlarged scale showing the end face of one tooth of the cutter.

Fig. 4 is a section taken on the line indicated at 4—4 in Fig. 3.

Figs. 5, 6, 7, 8 and 9 are diagrammatic views showing various forms of grinding wheels in engagement with the helicoid surfaces on the end face of the cutter.

Fig. 10 is a diagrammatic view showing the relative positions of the grinding wheel and cutter during the generation of the internal involute helicoid surface at the normally obtuse edge of a cutter tooth.

Referring to the accompanying drawings, the cutter, indicated generally by the reference numeral 1, has the form of a helical gear, being provided with helically disposed teeth 2 which have side faces 3 and 4 which are generated involute helicoid surfaces.

The end face of the cutter is disposed in a plane at right angles to the axis of the cutter and the involute helicoid side faces 3 and 4 of each tooth intersect the end face of the tooth, one at an obtuse angle and the other at an acute angle.

When the teeth of the cutter are disposed at relatively high helix angles as shown herein, the cutting edges which would be formed by intersection of the side faces 3 and 4 of the teeth with flat end faces would not be suitable for efficient cutting action since the cutting edge formed by the intersection of the tooth faces 3 with the end faces of the teeth would be very blunt, while the cutting edges formed by the intersections of the side faces 4 with the end faces of the teeth would be quite sharp.

To avoid the obtuse cutting edge at one side of the teeth and the acute cutting edge at the opposite side of the teeth, it has been conventional, in one well-known phase of the art, to intersect the obtuse side and the acute side, each with parallel planes normal to the helicoid. These parallel planes are formed by the side face of a disc milling cutter before hardening, and sharpened in the same manner by means of a disc grinding wheel after hardening. The cutting edges are formed, therefore, by parallel planes intersecting the involute helicoid sides of the teeth. Thus the cutting edges do not lie in a plane of revolution. As a result of this, troublesome errors are introduced in the teeth of the gear generated, necessitating costly subsequent operations to rectify and eliminate the errors to make them pure involutes, in a plane of revolution, to the given base circle, on each side of the teeth.

In another well known conventional practice in the art, the cutter is provided with cutting edges which are the result of intersecting the side faces of the teeth to form cutting edges by means of a plane substantially normal to the helicoidal teeth at the pitch circle. This practice, however, produces cutting edges the loci of points of which all lie in various planes of revolution.

In both of the conventional, well known practices referred to, the cutting edges are obtained by a plane intersecting the involute helicoid side teeth. Thus the advantages of involute helicoid teeth in work produced by the cutters are not obtained, the conventional practices referred to resulting in the teeth of the work having side faces of indeterminate helicoid, epitrochoid, involute form.

To overcome the difficulties referred to above, I prefer to provide cutting edges in the plane of revolution, that is to say, in a plane perpendicular to the axis of the cutter, by intersecting the involute helicoid side faces of the teeth of the cutter with their normal involute helicoid of the opposite hand, this for the reason that an involute curve is a single plane curve, and if an involute helicoid is intersected by its normal involute helicoid of the opposite hand, the locus of points of the line of intersection will lie in a plane perpendicular to the axis of the base or evolute circle, namely, in a plane of revolution. The involute curve of the teeth of the cutter in the plane of revolution, therefore, is not destroyed and will reproduce teeth in the work of the desired true involute form. Thus the inherent advantages of involute gearing are obtained in helical involute gears without it being necessary to perform any subsequent rectifying operations on the teeth of the gears or other work cut by this improved cutter.

Helical involute gears produced by this cutter, in commercial practice, as a result of this invention, are provided with true involute curves from the base circle to the peripheral point of the teeth, each side being like the other and therefore symmetrical. It has been found, as stated above, that the accuracy of the cutter may be depended upon to reproduce true involute helicoid surfaces on the teeth of the work when the cutting edges of the cutter are made in accordance with this invention, as herein referred to, by providing cutting edges which are the resultant locus of points of intersection of an involute helicoid by its normal involute helicoid of the opposite hand. In other words, I produce an accurate cutter by providing normal helicoidal involute surfaces of one hand on the end face of the cutter and intersecting helicoidal involute side faces of the opposite hand of the teeth of the cutter to form the cutting edges, the cutting edges being further defined as the locus of points of intersection of the righthand involute helicoid side surface of the teeth, which extend axially of the cutter, intersecting the lefthand involute helicoid surface on the end face of the cutter, which end face is radial and extends transversely of the cutter axis in a plane of revolution thereof, and vice versa for a cutter of the opposite hand.

From the foregoing, therefore, it is understood that the present invention contemplates the use of intersecting involute helicoids of the opposite hand to establish a cutting edge, and provides that a lefthand involute helicoid gear shaped or worm shaped cutter has cutting edges lying in a plane of revolution and defined as the locus of points on the lefthand involute helicoid of the cutter teeth being intersected by a righthand involute helicoid, and, similarly but in the reverse order, the teeth of a righthand involute helicoid cutter being intersected by a lefthand involute helicoid, all of said involutes having the same base or evolute circle.

In order to provide cutting edges at opposite sides of the teeth, which are substantially identical and of the sharpness most desirable for efficient generating action, the end faces of the teeth are ground back, along the cutting edges, to provide surfaces intersecting the side faces of the teeth at the desired angle. Along the end face of each tooth, adjacent the intersection of the side face 3 with the end face, there is ground a curved groove 5 which is V-shaped in cross-section, the outer wall 6 of the groove being in the form of an internal helicoid surface, involute to the same base cylinder as the side face 3, the helicoid surface 6 being substantially normal to the helicoid side face 3 and intersecting the side face 3 and establishing the locus of points to form a cutting edge, which is of involute form and which lies in a plane at right angles (perpendicular) to the axis of the cutter.

The side faces 4 of the teeth would normally intersect the end faces of the teeth at an acute angle too sharp for the most effective generating action. In order to form a cutting edge substantially identical with the locus of the points of the cutting edge formed by the intersecting involute helicoid surfaces 3 and 6, an external helicoid surface 7, involute to the same base cylinder as the side face 4, is generated along the edge of each tooth opposite that upon which the surface 6 is generated. The external involute helicoid surface 7, is substantially normal to the involute helicoid surface 4, and intersects the same in a plane perpendicular to the axis of the cutter.

The helicoid surfaces 6 and 7, at their intersections with the helicoid side faces 3 and 4 of the teeth, form involute cutting edges 8 and 9 which are the loci of points of the intersecting involute helicoid surfaces referred to, the said loci of points of which lie in planes perpendicular to the axis of the cutter. Each helicoid surface 7 is of exactly the same character as the surface 4 which it intersects, and may be generated with a grinding wheel in a gear generating machine in exactly the same way in which the surface 4 is generated. The helicoid surface 6, however, is an internal involute helicoid surface and must be generated with a grinding wheel of relatively small diameter, so disposed with respect to the surface 6 that the section through the grinding wheel, in the plane of the involute cutting edge being generated, is internally tangent to the involute during the generating movement.

In forming the cutter, the end face of the cutter may be originally formed flat with its surface in a plane perpendicular to the axis of the cutter, in which case, after the ground back surfaces are formed on the end face, flat portions 10 and 11 remain which were a part of the original flat surface.

While the external helicoid surface 7 may be generated with a grinding wheel of any desired diameter or by the engagement of the flat face of a grinding wheel with the edge portion of the tooth, as in generating the involute helicoid side faces of the teeth, it will generally be found more convenient to employ the same grinding wheel for generating the surface 7 as is employed for generating the surface 6.

In order to generate a true involute down to the root line of the tooth at the cutting edge, it will be necessary to use a cylindrical or conical grinding wheel of fairly small diameter.

Figs. 5 and 6 show a cyindrical grinding wheel 12 in engagement with the helicoid surfaces 7 and 6. As indicated in Fig. 10 of the drawings, this grinding wheel is mounted with its axis A in a plane T tangent to the base cylinder BC of the cutter and during the generating action, there is a relative movement of the grinding wheel and cutter which is a combined rotative and translative movement, the cutter rotating about its axis in a direction indicated by the arrow R, and the grinding wheel having a relative linear movement in the tangent plane T in a direction indicated by arrow L at right angles to the axis of the cutter at a rate equal to the linear speed of a point on the base cylinder of the cutter. The diameter of the cylindrical grinding wheel will be such that the elliptical section through the grinding wheel in the plane of the cutting edge being generated which is perpendicular to the axis of the cutter will have a radius of curvature at its vertex not greater than the radius of curvature of the involute at the root line of the tooth, so that during the entire generating action, the grinding wheel remains tangent to the involute curve of the cutting edge.

The maximum size for a cylindrical grinding wheel may be computed for any given cutter by the formula:

$$d = \frac{p \text{ pi } r}{90 \sin h}$$

where $d$ is the diameter of the grinding wheel, $p$ is the pressure angle, $r$ the radius of the base circle of the cutter and $h$ the angle of the helicoid surface 6 to the plane of the cutting edge 8 measured on the base circle.

The grinding wheel may be conical, if desired, and Figs. 7 and 8 show conical wheels 13 engaging the surfaces 6 and 7. When a grinding wheel of conical form is used, the maximum diameter of the grinding wheel measured at the generating vertex of the ellipse in the plane of the cutting edge being generated may be computed by the formula:

$$d = \frac{p \text{ pi } r \sin (h - 2a)}{90 \sin^2 (h - a) \cos a}$$

where $d$ is the diameter of the grinding wheel, $p$ is the pressure angle, $h$ is the angle of the helicoid surface 6 to the end face of the cutter measured at the base cylinder and $a$ is the angle of taper of the cone. Since the radius of curvature of an involute at any point is the length of the tangent from that point to the base circle, it will be obvious that a cylindrical or conical grinding wheel of a given diameter will correctly generate the internal involute outwardly from the point on the involute where the radius of curvature of the involute equals the radius of curvature of the grinding wheel measured in the plane of the involute and that even though the grinding wheel be of a diameter somewhat greater than that required to correctly generate the involute to the root line of the tooth, the involute will be correctly generated to within a short distance from the root line and the error immediately adjacent the root line will be very slight. In some instances, the curvature at the root line may be so great that it may not be convenient to employ a grinding wheel small enough for theoretically correct generation to the root line. In such cases, a grinding wheel somewhat larger than the theoretically correct size may be employed and will generate the correct involute cutting edge throughout the major portion of the length of the said cutting edge with only a very slight deviation therefrom immediately adjacent the root line.

Where the helix angle of the cutter teeth is a relatively small angle, the grinding wheel may be of larger diameter or may be in the form of a cone, with a taper opposite that shown in Figs. 7 and 8, in which case the section through the grinding wheel in the plane of the cutting edge will be a hyperbola. In Fig. 9, a reversely tapered grinding wheel 14 is shown for generating an internal helicoid surface disposed at a small angle to the end face of the cutter. The cylindrical form of grinding wheel is considered preferable, since its elliptical section in the plane of the cutting edge has a radius of curvature at the vertex smaller than the corresponding section through a conical wheel such as shown in Figs. 7 and 8. The involute helicoid surfaces 6 and 7 may be generated with grinding wheels such as above described in a gear generating machine such as shown in my Patent No. 1,752,033 granted March 25, 1930, by providing on the grinding wheel head suitable means for mounting cylindrical or conical grinding wheels such as shown in Figs. 5 to 9. The grinding wheel will be mounted with its axis in a plane tangent to the base cylinder of the cutter and in the operation of the machine, the work spindle carriage will be reciprocated into and out of engagement with the grinding wheel with the rate of linear movement of the carriage proportional to the speed of rotation of the cutter measured on the base cylinder.

If the helicoid surfaces 6 and 7 are substantially normal to the tooth faces 3 and 4 at or near the root lines of the teeth, the angle between the tooth faces and helicoid surfaces at the ends of the teeth will gradually decrease toward the tips of the teeth. The difference in the angle, however, at the roots and tips of the teeth is slight and a slightly acute cutting edge is highly desirable.

It will be apparent that the present invention provides a method of forming cutting edges at the ends of helically disposed teeth which are true involutes lying in planes perpendicular to the axis of the cutter, and such cutting edges will generate true involute tooth surfaces in a blank regardless of the angular position of the cutter with respect to the blank.

Furthermore, the present invention enables helical cutters to be successfully used which have teeth disposed at helix angles as great as 45°.

What I claim is:

1. A gear shaped cutter having peripheral teeth and an end face with helicoid surfaces thereon, each surface intersecting a tooth face in a plane perpendicular to the axis of the cutter to form a cutting edge.

2. A gear shaped cutter having teeth of involute form and an end face with helicoid surfaces thereon which are involute to the same base cylinder as the side faces of the teeth of the cutter, each of said helicoid surfaces intersecting a tooth face to form a cutting edge.

3. A gear shaped cutter having an end face and teeth provided with helicoid side faces, said end face having helicoid surfaces oppositely inclined with respect to helicoid faces of the teeth, each surface intersecting a tooth face in a plane perpendicular to the axis of the cutter to form a cutting edge.

4. A gear shaped cutter having an end face and teeth provided with involute helicoid side faces, said end face having helicoid surfaces involute with respect to the same base cylinder as the helicoid side faces of the teeth and intersecting said side faces to form involute cutting edges.

5. A gear shaped cutter having an end face and teeth provided with involute helicoid side faces, each tooth having an end face provided with involute helicoid surfaces intersecting the side faces at substantially right angles to form involute cutting edges.

6. A gear shaped cutter having helically disposed teeth of involute form, each tooth having an end face provided with an internal involute helicoid surface intersecting a side face of the tooth in a plane perpendicular to the axis of the cutter.

7. A gear shaped cutter having helically disposed teeth of involute form, each tooth having an end face provided with an internal involute helicoid surface substantially normal to one of said side faces and intersecting the same to provide an involute cutting edge.

8. A gear shaped cutter having helically disposed teeth of involute form, each tooth having an end face provided with two involute helicoid surfaces generated along the opposite edges of the tooth, one of said generated surfaces being internal and one external.

9. A gear shaped cutter having helically disposed teeth of involute form and an end face disposed substantially in a plane at right angles to the axis of the cutter, one side face of each tooth intersecting the end face at an obtuse angle and the other at an acute angle, and involute helicoid surfaces generated along the end edges of the teeth and substantially normal to the side faces to provide involute cutting edges.

10. A gear shaped cutter having helically disposed teeth of involute form, each tooth having an end face provided with an external involute helicoid surface intersecting a side face of the tooth to form a cutting edge of involute form.

11. The herein described method of forming cutting edges at the ends of teeth of a gear shaped cutter which comprises generating on the end faces of the teeth helicoid surfaces each intersecting a side face of a tooth in a plane perpendicular to the axis of the cutter.

12. The herein described method of forming cutting edges at the ends of teeth of a gear shaped cutter whose teeth have side faces of involute form which comprises generating on the end faces of the teeth helicoid surfaces which are involute to the same base cylinder as the side faces of the teeth and which intersect said side faces of the teeth to form involute cutting edges.

13. The herein described method of forming the cutting edges at the ends of teeth of a gear shaped cutter whose teeth have side faces of involute helicoid form which comprises generating along the edges of said end faces of the teeth helicoid surfaces involute to the same base cylinder as the side faces of the teeth and each intersecting a side face in a plane perpendicular to the axis of the cutter.

14. The herein described method of forming the cutting edges at an end face of a gear shaped cutter whose teeth have side faces of involute form, which comprises generating on the end faces of the teeth helicoid surfaces which are involute to the same base cylinder as the side faces of the teeth and which intersect said side faces of the teeth to form involute cutting edges by rotating a metal cutting element on an axis arranged in a plane tangent to the base cylinder of the cutter and in cutting engagement with the end face of the cutter rotating on its axis, and imparting to the cutting element a linear movement in the said tangential plane in a direction at right angles to the axis of the cutter and at a rate equal to the linear speed of a point on the base cylinder of the rotating cutter.

15. The herein described method of forming the cutting edges on an end face of a gear shaped cutter whose teeth have side faces of involute helicoid form, which comprises generating along the edges of the end faces of the teeth helicoid surfaces involute to the same base cylinder as the side faces of the teeth and each intersecting a side face in a plane perpendicular to the axis of the cutter by rotating a cutting element on an axis arranged in a plane tangent to the base cylinder of the cutter and in metal cutting engagement with the end face of the cutter rotating on its axis, and imparting to said cutting element and cutter a relative linear movement in the said tangential plane and in a direction at right angles to the axis of the cutter at a rate equal to the linear speed of a point on the base cylinder of the rotating cutter.

16. A gear shaped cutter having helical teeth provided with involute side faces and end faces in a plane of revolution, said end faces of each tooth being provided with generated helical surfaces involute to the same base cylinder as the involute side faces of the teeth, with one of such surfaces a righthand involute and another a lefthand involute, said surfaces intersecting respectively an involute side face of the opposite hand.

17. A gear shaped cutter having helical teeth provided with involute side faces and end faces in a plane of revolution, said end faces of each tooth being provided with generated helical surfaces involute to the same base cylinder as the involute side faces of the teeth, with one of the surfaces a righthand involute and another a lefthand involute, said surfaces intersecting respectively an involute side face of the opposite hand with one external and the other internal.

In testimony whereof I affix my signature.

OLIVER G. SIMMONS.